(12) United States Patent
Lu et al.

(10) Patent No.: US 11,367,909 B2
(45) Date of Patent: Jun. 21, 2022

(54) POWER DEVICE CAPABLE OF DISPLAYING VARIOUS STATUSES AND DISPLAYING METHOD

(71) Applicant: VOLTRONIC POWER TECHNOLOGY CORP., Taipei (TW)

(72) Inventors: Yu-Cheng Lu, Taipei (TW); Juor-Ming Hsieh, Taipei (TW)

(73) Assignee: VOLTRONIC POWER TECHNOLOGY CORP., Taipei (TW)

(*) Notice: Subject to any disclaimer, the term of this patent is extended or adjusted under 35 U.S.C. 154(b) by 236 days.

(21) Appl. No.: 16/889,811

(22) Filed: Jun. 2, 2020

(65) Prior Publication Data
US 2021/0226271 A1 Jul. 22, 2021

(30) Foreign Application Priority Data
Jan. 16, 2020 (TW) .................. 109101572

(51) Int. Cl.
*H01M 10/48* (2006.01)
*H01M 10/46* (2006.01)
(Continued)

(52) U.S. Cl.
CPC .......... *H01M 10/488* (2013.01); *G06F 1/263* (2013.01); *H01M 10/465* (2013.01);
(Continued)

(58) Field of Classification Search
CPC ... H01M 10/488; H01M 10/465; G06F 1/263; H02J 7/0047; H02J 2300/24;
(Continued)

(56) References Cited

U.S. PATENT DOCUMENTS 10,859,229 B1 * 12/2020 Elwell .................. F21S 43/195
10,887,964 B1 * 1/2021 Garrasi .................. H02H 3/046
(Continued)

FOREIGN PATENT DOCUMENTS

CN 209149245 U 7/2019
CN 110447158 A 11/2019
(Continued)

*Primary Examiner* — Stacy Whitmore
(74) *Attorney, Agent, or Firm* — Li & Cai Intellectual Property Office

(57) ABSTRACT

A power device capable of displaying various statuses and a displaying method are provided. The power device includes: a central microprocessor, a power conversion circuit, an LED bar (or a light bar) circuit, and a battery pack. The central microprocessor intrinsically has color setting and control logic and is internally provided with a color setting and control logic circuit. The power device is externally connected to a utility power source, a solar photovoltaic power source, a backup battery pack, and a load. The color setting and control logic circuit enables the LED bar circuit to correspondingly emit LED light of at least two colors according to different power sources supplied to the load or a battery capacity, and the LED light is displayed in a breathing-like manner. The central microprocessor adjusts a breathing rate of the LED light according to a power consumption of the load.

10 Claims, 8 Drawing Sheets

(51) Int. Cl.
*H05B 45/20* (2020.01)
*G06F 1/26* (2006.01)
*H02S 40/38* (2014.01)
*H02J 7/00* (2006.01)
*H05B 47/165* (2020.01)

(52) U.S. Cl.
CPC ............ *H02J 7/0047* (2013.01); *H02S 40/38* (2014.12); *H05B 45/20* (2020.01); *H05B 47/165* (2020.01); *H02J 2300/24* (2020.01)

(58) Field of Classification Search
CPC ....... H02J 7/0048; H02J 7/0049; H02S 40/38; H05B 45/20; H05B 47/165; H05B 47/105; Y02E 10/56; Y02E 60/10; Y02E 70/30
See application file for complete search history.

(56) References Cited

U.S. PATENT DOCUMENTS

| | | | |
|---|---|---|---|
| 11,288,754 B2 * | 3/2022 | ElBsat | G06Q 50/06 |
| 2005/0017582 A1 | 1/2005 | Young | |
| 2009/0179496 A1 | 7/2009 | Ho et al. | |
| 2009/0295227 A1 * | 12/2009 | Chang | H02J 3/381 |
| | | | 307/46 |
| 2011/0148311 A1 * | 6/2011 | Neuman | H05B 45/37 |
| | | | 315/363 |
| 2011/0221383 A1 * | 9/2011 | Uehashi | H02J 7/35 |
| | | | 320/101 |
| 2013/0002031 A1 * | 1/2013 | Mulkey | H02M 7/48 |
| | | | 307/43 |
| 2014/0265585 A1 * | 9/2014 | Della Sera | H02J 3/383 |
| | | | 320/101 |
| 2016/0344190 A1 * | 11/2016 | Reineccius | H02J 3/386 |
| 2019/0067961 A1 * | 2/2019 | King | H02J 7/0045 |
| 2019/0286090 A1 * | 9/2019 | Tabib | G06F 1/28 |
| 2020/0073342 A1 * | 3/2020 | Lee | G06Q 10/04 |
| 2020/0185670 A1 * | 6/2020 | Hiratsuka | H02J 7/00 |
| 2021/0091556 A1 * | 3/2021 | Pursifull | H02J 13/00002 |
| 2021/0098988 A1 * | 4/2021 | Gokhale | H02J 3/008 |
| 2021/0321176 A1 * | 10/2021 | Aguado Giraldo | G01D 4/00 |

FOREIGN PATENT DOCUMENTS

| | | | | |
|---|---|---|---|---|
| CN | 215581810 U | * | 1/2022 | |
| CN | 215647487 U | * | 1/2022 | |
| CN | 215734933 U | * | 2/2022 | |
| EP | 3226380 A1 | | 10/2017 | |
| TW | M550503 U | | 10/2017 | |
| TW | 201914146 A | | 4/2019 | |
| WO | WO-2009065277 A1 | * | 5/2009 | ......... H05B 33/0863 |

* cited by examiner

POWER DEVICE CAPABLE OF DISPLAYING VARIOUS STATUSES AND DISPLAYING METHOD

CROSS-REFERENCE TO RELATED PATENT APPLICATION

This application claims the benefit of priority to Taiwan Patent Application No. 109101572, filed on Jan. 16, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power device capable of displaying various statuses and a displaying method thereof, and more particularly to a power device that has different structural assembly modes and can make different assembly changes according to different environments in different mounting positions.

BACKGROUND OF THE DISCLOSURE

In the related art, a display device fitted on a common power device, for example, a common grid-connected solar inverter, off-grid/energy-storage solar inverter, or uninterrupted power supply (UPS) device, is usually a liquid crystal display (LCD) screen or a plurality of single-color (bicolor) light emitting diodes (LEDs) used to display different operating statuses of the device. However, a machine is usually installed on an easily mounted position, for example, on an elevated position on a wall or a position near a window; and is unlikely to be placed on a personal desk. Therefore, in order to learn a current operating status of the machine, a monitoring personnel needs to walk to the LCD display screen before reading the current operating status of the machine and related information, bringing inconvenience to a monitor or an observer. Moreover, the single-color (bicolor) LED is limited to undiversified colors, or a plurality of different colors of LEDs needs to be simultaneously provided to achieve color variation, bringing a burden to the space. Therefore, it is necessary to research and develop a way for the monitor or observer to conveniently and immediately tell a current operating status of the off-grid/energy-storage solar inverter or the UPS device, so as to solve the problem that the solar inverter or the UPS device is not easily observed in the related art.

SUMMARY OF THE DISCLOSURE

In response to the above-referenced technical inadequacies, the present disclosure provides a power device capable of displaying various statuses and a displaying method, making it convenient for a user, observer, or monitor to conveniently and immediately tell a current operating status of the power device. In the present disclosure, an LED (or a light strip or light bar) circuit is made to change in colors according to different power sources of a load or a battery capacity, and the LED light circuit is displayed in a breathing-like manner at different breathing rates to indicate whether a low current or a heavy current passes through the load in operation or indicate the battery capacity; or the LED light is displayed in a chase pattern at different chasing rates to indicate a battery discharging rate. That is, the present disclosure can display various statuses of the device with different colors by using a single LED (or a light strip or light bar) on the same position, which is different from the conventional product that needs to use a plurality of LEDs of different colors on different positions to respectively indicate the device statuses. Moreover, the present disclosure enables the user, observer, or monitor, beyond a certain distance from the power device, to conveniently and immediately tell a current power usage status of the load connected to the power device, thus learning power usage of a machine without the need to walk to the power device to read information displayed on its LCD screen. The power device of the present disclosure may be an off-grid/energy-storage solar inverter or a UPS device.

The power device capable of displaying various statuses of the present disclosure includes: a central microprocessor, internally provided with a color setting and control logic circuit, which indicates that the central microprocessor intrinsically has color setting and control logic; a power conversion circuit, electrically coupled to the central microprocessor; an LED bar circuit, electrically coupled to the central microprocessor; and a battery pack, electrically coupled to the power conversion circuit and being one of power sources of the power device, where the power device is electrically coupled to a utility power source and a solar photovoltaic power source which serve as different power sources of the power device; an output of the power device is electrically coupled to a load; the color setting and control logic circuit enables the LED bar circuit to correspondingly emit LED light of at least two colors according to different power sources supplied to the load, and the LED light is displayed in a breathing-like manner; and the central microprocessor adjusts a breathing rate of the LED light according to a power consumption of the load.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1A:
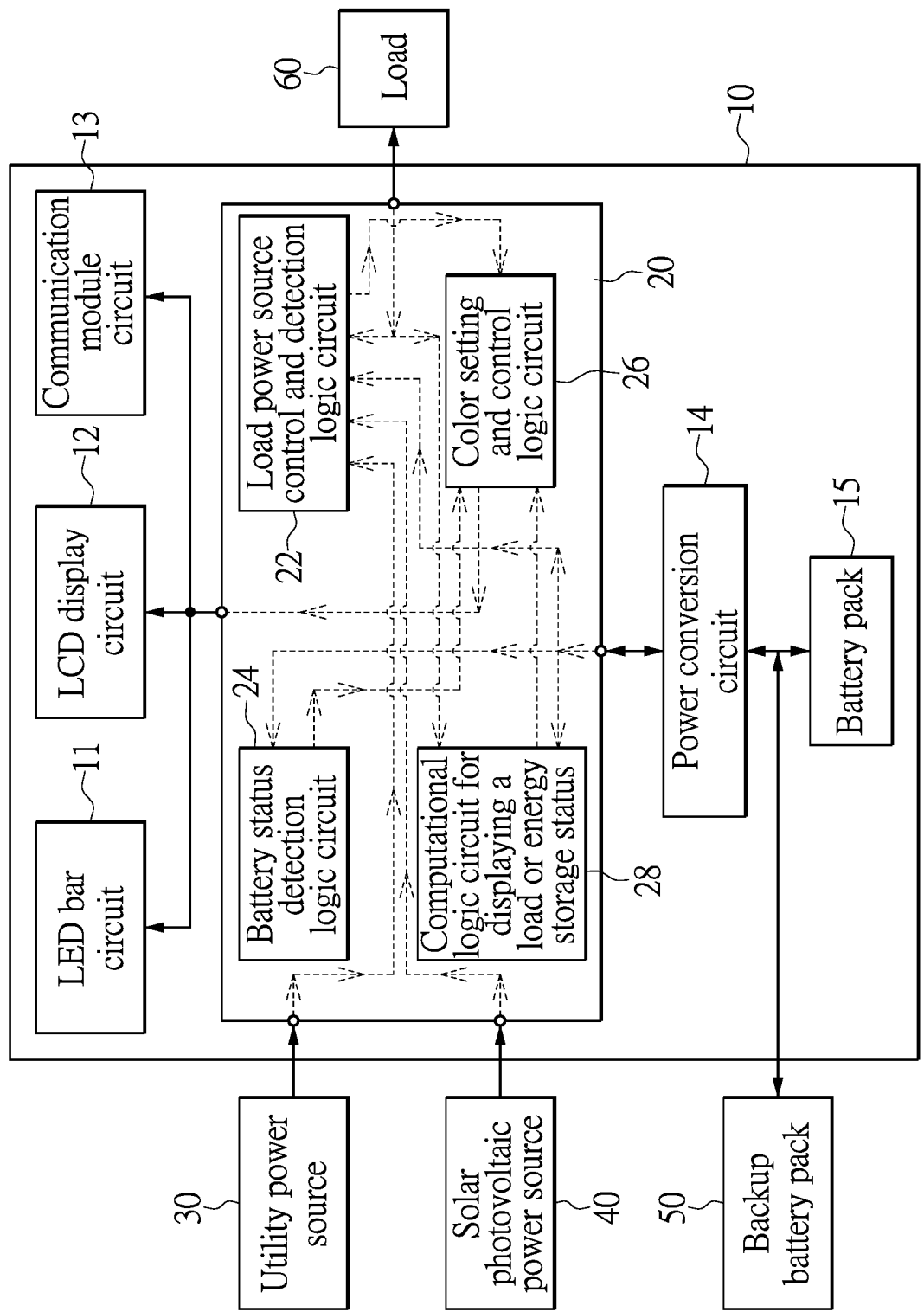
FIG. 1A is a block diagram showing circuit connection in an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure discloses a power device capable of displaying various statuses and a displaying method, which mainly use a single LED (or a light strip or light bar) to replace a plurality of single-color LEDs on a conventional product to display device statuses via control and detection logic of a central microprocessor (CPU). Thus, a monitor can know a power usage status of a machine without the need to walk to the power device to read information displayed on its LCD) screen, alleviating inconveniences in the related art. By an additionally set LED bar circuit and a relevant control circuit, a user still can conveniently and immediately tell the current power usage and operating status of the power device beyond a certain distance.

Various exemplary embodiments will be fully described below with reference to the accompanying drawings, and some exemplary embodiments are illustrated in the accompanying drawings. However, the concept of the present disclosure may be embodied in many different forms, and should not be construed as being limited to the exemplary embodiments described herein. Specifically, these exemplary embodiments are provided to make the present disclosure detailed and complete, and to fully convey the scope of the concept of the present disclosure to those skilled in the art. In the drawings, in order to clearly express the structures of components, the size of a part, an object, or an image and a relationship between a relative size and connection or coupling may be exaggerated. In addition, similar numerals always denote similar elements.

It should be understood that, the terms: front (side), rear (side), upper side or lower side, left side or right side, and the like, that are probably used in the specification aim to clearly distinguish the position of an element from a relative position of the element, or a positional difference between one element and another element, or a relative positional difference between different components. These terms are not intended to limit a sequence shown by text, numbers, or literal meaning; or absolute positions. Therefore, a left (or front) component set forth in the following description may be referred to as a right (or rear) component without departing from the concept of the present disclosure, and does not necessarily denote any textual or numerical succession or order. Moreover, the term "multiple" or "a plurality of" may be used in the specification to reveal that a plurality of elements is provided. However, the number of the elements is not limited to two, three, four, or more in the implemented technology. Referring to FIG. 1A, a power device 10 capable of displaying various statuses of the present disclosure includes a central microprocessor 20, an LED bar circuit 11, an LCD display circuit 12, a communication module circuit 13, a power conversion circuit 14, and a battery pack 15. The power device 10 is further externally and electrically coupled to a utility power source 30 and a solar photovoltaic power source 40, which serve as different power sources of the power device 10 and supply electric energy to the power device 10. Different forms of electric energy after conversion is then supplied to a load. An output of the power device 10 is electrically coupled to the load 60. In addition, the power device 10 of the present disclosure is further electrically coupled to a backup battery pack 50 which is used as a backup power source of the power device 10. The central microprocessor 20 intrinsically has color setting and control logic, and is internally provided with a color setting and control logic circuit 26. In an actual application, the central microprocessor 20 may be a device element such as a central processing unit (CPU), a microprocessor, a microcontroller unit (MCU), or a graphics processing unit (GPU). The color setting and control logic circuit 26 is constructed in an internal logic circuit of the central microprocessor 20. That is, the color setting and control logic circuit 26 is implemented by the color setting and control logic and a program architecture that are executed in the central microprocessor 20. In another embodiment, the central microprocessor 20 may also be a microcontroller. The constituent elements of the microcontroller include a circuit architecture designed for logic control of the color setting and control logic circuit 26.

The power conversion circuit 14 is electrically coupled to the central microprocessor 20. In an actual application, the power conversion circuit 14 may be a converter, a current transformer, an inverter, or the like that is formed by a combination of a plurality of power switching elements, and can convert different power sources to supply required power to the load 60. The LED bar circuit 11 is also electrically coupled to the central microprocessor 20. During actual manufacturing, a single or a plurality of LED light-emitting elements (not shown in the figure) is provided in the LED bar circuit 11, and specifically, there may be an even or odd number of LED light-emitting elements. For example, 12, 24, 13 or 25 LED light-emitting elements are linearly arranged in the LED bar circuit 11. Afterwards, a light guide layer, a polarizing layer, or a light concentrating layer is further disposed on the single or the plurality of LED light-emitting elements to evenly diffuse light emitted from the single or the plurality of LED light-emitting elements, so as to improve an illumination effect of the LED bar circuit 11. The battery pack 15 is electrically coupled to the power conversion circuit 14, and is used as one of several different power sources of the power device 10. In an actual application, the battery pack 15 is formed by a plurality of batteries connected in series or parallel. If necessary, a single large battery may be used as a main constituent element of the battery pack 15. Moreover, the power device 10 of the present disclosure further includes an LCD display circuit 12 and a communication module circuit 13. The LCD display circuit 12 is coupled to the central microprocessor 20, and mainly uses an LCD screen to display text and digital information related to an operation of the power device 10. The communication module circuit 13 is also coupled to the central microprocessor 20, and is used to establish a communicative connection between the power device 10 and an external device or other communication devices, such as a smart phone or tablet PC of the user, or an electric device monitoring server.

Figure 1B:
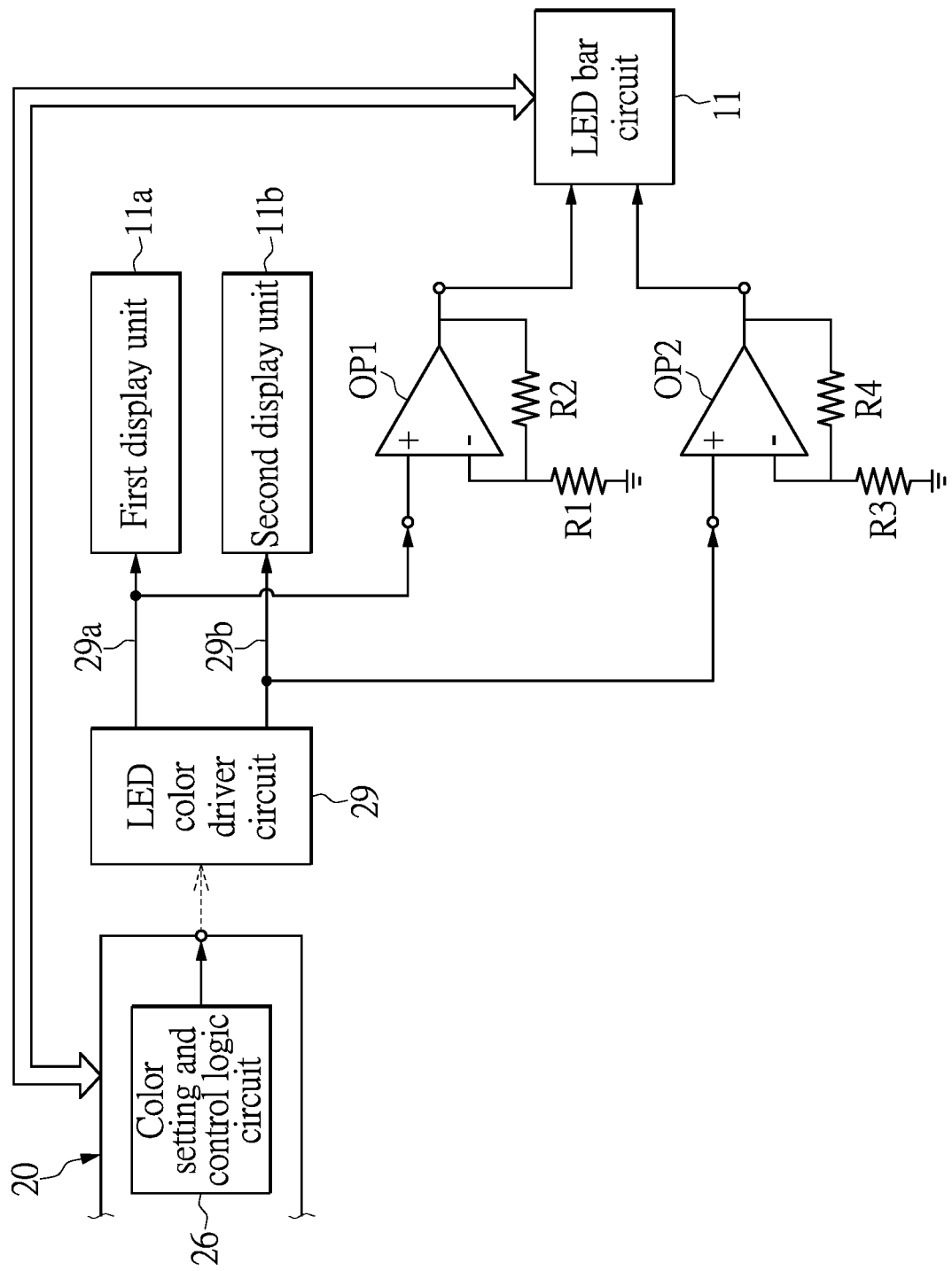
FIG. 1B is a block diagram showing circuit connection of a color setting and control logic circuit in an embodiment of the present disclosure.
Figure 5:
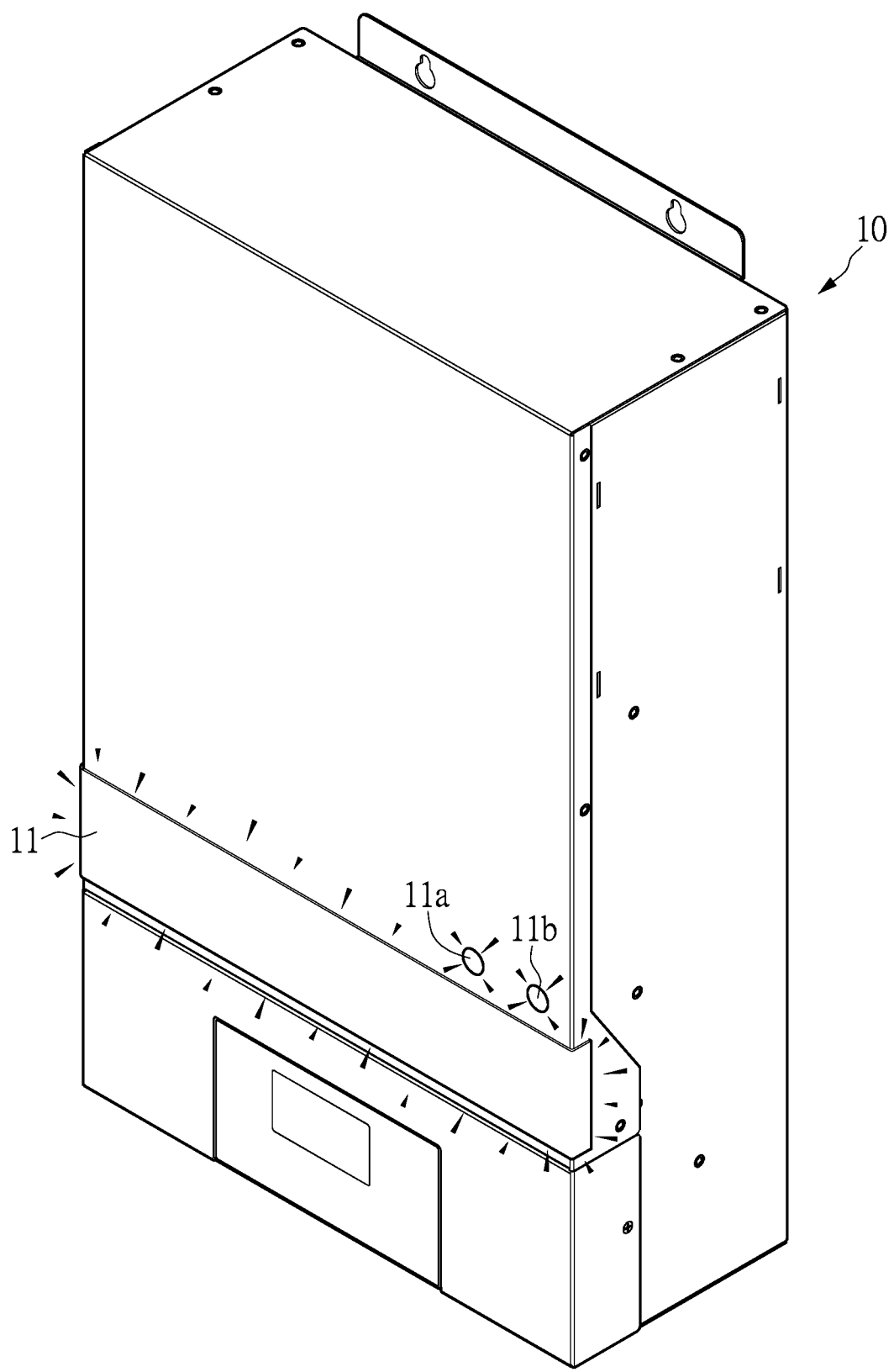
FIG. 5 is a schematic view of a power device in an embodiment of the present disclosure.
Figure 6:
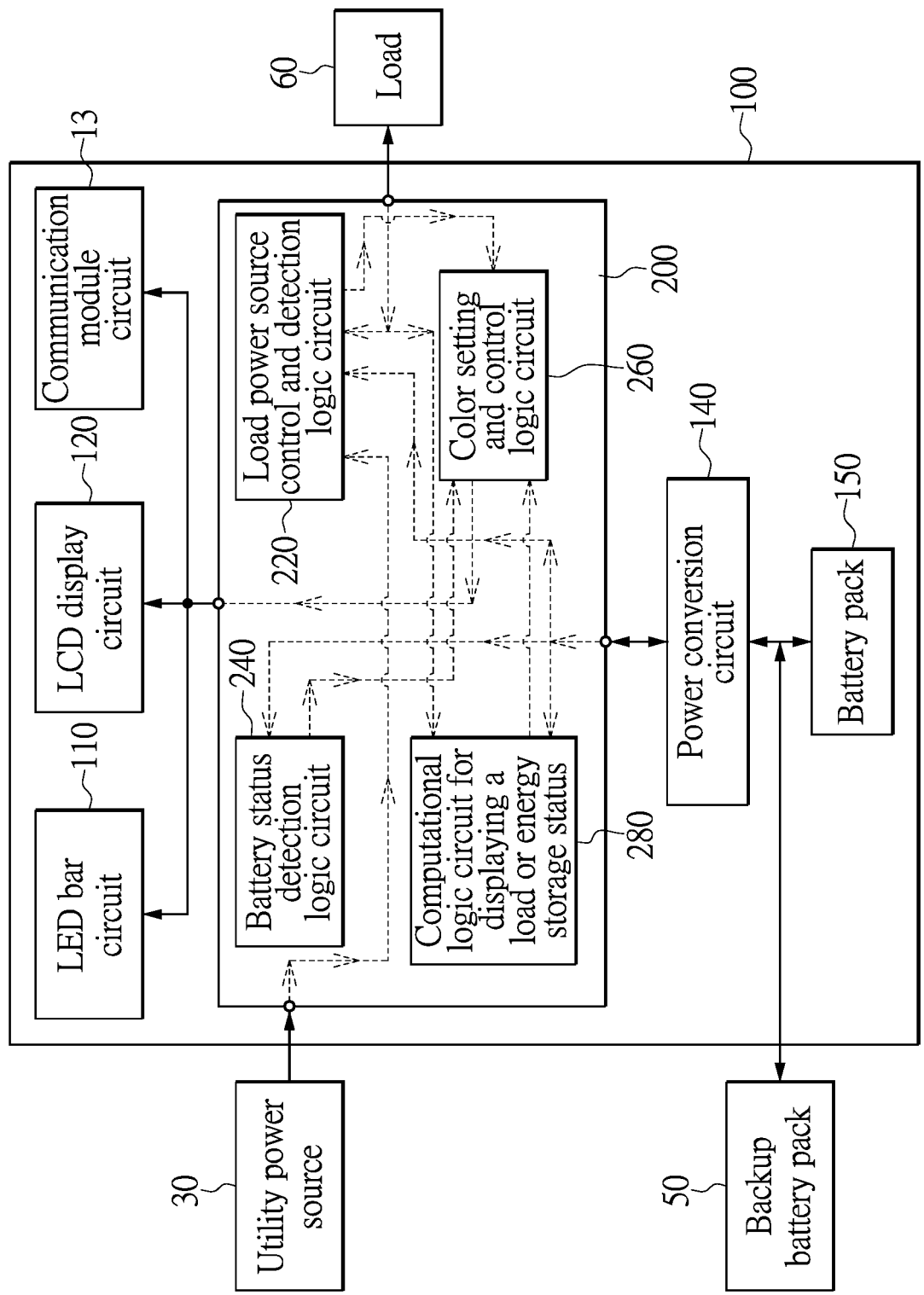
FIG. 6 is a block diagram showing circuit connection in another embodiment of the present disclosure.
Figure 7:
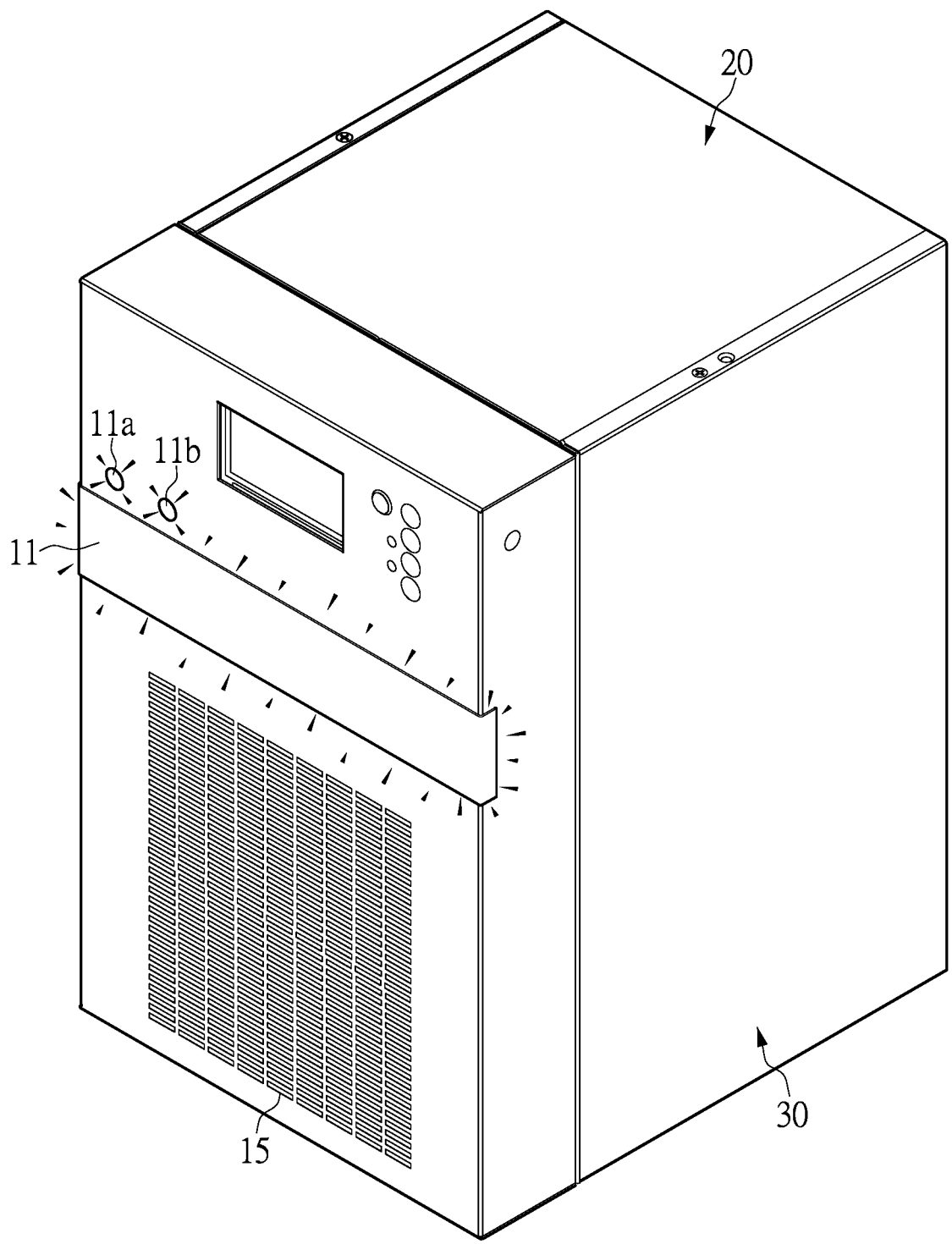
FIG. 7 is a schematic view of a power device in another embodiment of the present disclosure.

It should be noted that the power device 20 of the present disclosure may be an off-grid/energy-storage solar inverter in an actual application, and reference may be made to FIGS. 1A, 1B and 5; or the power device is a UPS device, and reference may be made to FIGS. 6, 1B and 7. Exterior structures shown in FIGS. 5 and 7 are only embodiments for reference, and the technical effect of the present disclosure is achieved by mainly depending on the circuit connection shown in block diagrams of FIGS. 1A, 1B and 6, so that the user still can conveniently and immediately tell the current power usage and operating status of the power device beyond a certain distance.

Further, in an actual application, the color setting and control logic circuit 26 in the central microprocessor 20 of the present disclosure may control the LED bar circuit 11 to correspondingly emit LED light of at least two colors according to different power sources (for example, the solar photovoltaic power source, the utility power source, or the battery pack) supplied to the load 60. The LED light is displayed in a breathing-like manner, which indicates that the emitted LED light is displayed by a brightness change at a rate identical with an average breathing rate of a human. That is to say, the LED light of at least two colors emitted by the LED bar circuit 11 in the present disclosure changes in brightness at a rate identical with the breathing rate of a human (which usually means long exhalation and short inspiration). In addition, the central microprocessor 20 may also adjust a breathing rate of the LED light according to a power consumption of the load 60. That is to say, when the load 60 has a large power consumption (which means that the current is heavy), the LED light changes in brightness at a fast rate; and when the load 60 has a small power consumption (which means that the current is low), the LED light changes in brightness at a slow rate.

Further, the color setting and control logic circuit 26 may also emit LED light of at least two colors according to different usage statuses of the battery pack 15. In still another embodiment, when the battery pack 15 performs charging or discharging, the LED light emitted by the LED bar circuit 11 of the present disclosure is displayed in a chase pattern, which means that the single or plurality of LED light-emitting elements in the LED bar circuit 11 is sequentially turned on and then sequentially turned off. For example, these LED light-emitting elements are turned on from left to right and then sequentially turned off from left to right; or turned on from left to right and then sequentially turned off from right to left. Moreover, the central microprocessor may adjust a chasing rate of the LED light according to a charging/discharging rate of the battery pack 15. In addition, when the battery pack 15 is fully charged or in a low-power status, the LED light is displayed in a breathing-like manner, and then the central microprocessor 20 adjusts the breathing rate of the LED light according to a charging percentage or a low-power percentage of the battery pack 15.

As shown in FIG. 1A, the central microprocessor 20 of the present disclosure further includes a load power source control and detection logic circuit 22, a battery status detection logic circuit 24, and a computational logic circuit 28 for displaying a load or energy storage status. The load power source control and detection logic circuit 22 and the utility power source 30 are indirectly electrically coupled, which means that the load power source control and detection logic circuit 22 in the central microprocessor 20 is indirectly connected to the utility power source 30. It is known to those of ordinary skill in the art that, a direct electric connection may burn the central microprocessor 20. Therefore, the indirect electrical coupling described herein indicates that there is a buffer circuit, for example, a buck circuit or an alternating current to direct current (AC-DC) conversion circuit, between the load power source control and detection logic circuit 22 in the central microprocessor 20 and the utility power source 30. More importantly, the indirect electrical coupling between the load power source control and detection logic circuit 22 and the utility power source 30 enables the load power source control and detection logic circuit 22 to detect a current power supply status of the utility power source 30, therefore facilitates a detection function. The load power source control and detection logic circuit 22 is also indirectly electrically coupled to the solar photovoltaic power source 40, and then is indirectly electrically coupled to the load 60. Moreover, the load power source control and detection logic circuit 22 is electrically coupled to the power conversion circuit 14 and the color setting and control logic circuit 26, so that the load power source control and detection logic circuit 22 enables the central microprocessor 20 to further identify a specific power source which is externally or internally supplied to the power device 10 of the present disclosure when the load 60 consumes power in operation. That is to say, the central microprocessor 20 can know a current power supply situation in which the load 60 consumes one or a combination of the utility power source 30, the solar photovoltaic power source 40, and the battery pack.

The battery status detection logic circuit 24 in FIG. 1A is electrically coupled to the power conversion circuit 14 and the color setting and control logic circuit 26, and is used to enable the central microprocessor 20 to identify an operating status of the battery pack 15, for example, to identify whether the battery pack 15 is currently in a charging status or a discharging status or whether the battery pack 15 is fully charged or whether the battery pack is in a low-power status (when the battery runs out). In addition, the computational logic circuit 28 for displaying a load or energy storage status is also indirectly electrically coupled to the load 60, and is electrically coupled to the power conversion circuit 14 and the color setting and control logic circuit 26. The computational logic circuit 28 for displaying a load or energy storage status of the present disclosure is used to enable the central microprocessor 20 to identify a status of the load 60 connected to the power device 20, for example, to identify an actual power consumption of the load 60 in operation so as to learn a power consumption of the load in operation; and further to identify different statuses of the battery pack 15 during charging or discharging.

FIG. 1B shows circuit coupling between the color setting and control logic circuit 26 and the LED bar circuit 11 in the present disclosure, to make a further technical disclosure. An LED color driver circuit 29, a first display unit 11a, a second display unit 11b, a first amplifier OP1, a second amplifier OP2, and a plurality of resistors R1 to R4 are provided between the central microprocessor 20 and the LED bar circuit 11. The LED color driver circuit 29 is electrically coupled to the central microprocessor 20, and used to receive a control signal output by the central microprocessor 20 and then generate a first control signal 29a and a second control signal 29b. The first control signal 29a is used to prompt the LED bar circuit 11 to display a current usage status of a power source of the load 60, and the second control signal 29b is used to prompt the LED bar circuit 11 to display a current usage status of the battery pack 15. That is, the LED bar circuit 11 can display both the current usage status of a power source of the load 60 and the current usage status of the battery pack 15, and the first control signal 29a and the second control signal 29b are used to enable a switch between the two display statuses. The first control signal 29a is electrically coupled to the first display unit 11a and the second control signal 29b is electrically coupled to the second display unit 11b.

In an actual application, the first display unit 11a and the second display unit 11b can separately use a single LED light-emitting element as their respective light-emitting device. The first display unit 11a and the second display unit 11b conduct alternate displaying. For example, when the first display unit 11a is turned on (the second display unit 11b is turned off in this case), it indicates that the LED bar circuit 11 currently displays a real-time usage status of a power source of the load 60; and when the second display unit 11b is turned on (the first display unit 11a is turned off in this case), it indicates that the LED bar circuit 11 currently displays a real-time power usage status of the battery pack 15. Afterwards, the first control signal 29a is further coupled to a non-reverse input end of the first amplifier OP1, and is amplified by the first amplifier OP1 and then transmitted to the LED bar circuit 11, so as to drive the LED bar circuit 11 to display usage statuses of different power sources of the load 60 in operation. The second control signal 29b is coupled to a non-reverse input end of the second amplifier OP2, and is amplified by the second amplifier OP2 and then also transmitted to the LED bar circuit 11, so as to drive the LED bar circuit 11 to display an operating status of the battery pack 15.

Firstly, reference is made to FIG. 5, which shows a device implementation of the power device 10 provided with the first display unit 11a and the second display unit 11b in practice. The first display unit 11a is provided on a side of the LED bar circuit 11. As shown in FIG. 5, the first display unit 11a is provided on an upper side of the LED bar circuit 11, and is electrically coupled to the central microprocessor 20 with the LED color driver circuit 29 as an intermediate medium. The first display unit 11a is used to indicate that the LED bar circuit 11 currently displays an operating status of a power source of the load 60. The second display unit 11b is also provided on a side (for example, an upper side) of the LED bar circuit 11, and is also electrically coupled to the central microprocessor 20 with the LED color driver circuit 29 as an intermediate medium. The second display unit 11b is used to indicate that the LED bar circuit 11 currently displays a real-time operating and execution status of the battery pack 15. As described above, the first display unit 11a and the second display unit 11b are alternately turned on or turned off, that is, only one of the first display unit 11a and the second display unit 11b is turned on at once.

Figure 2:
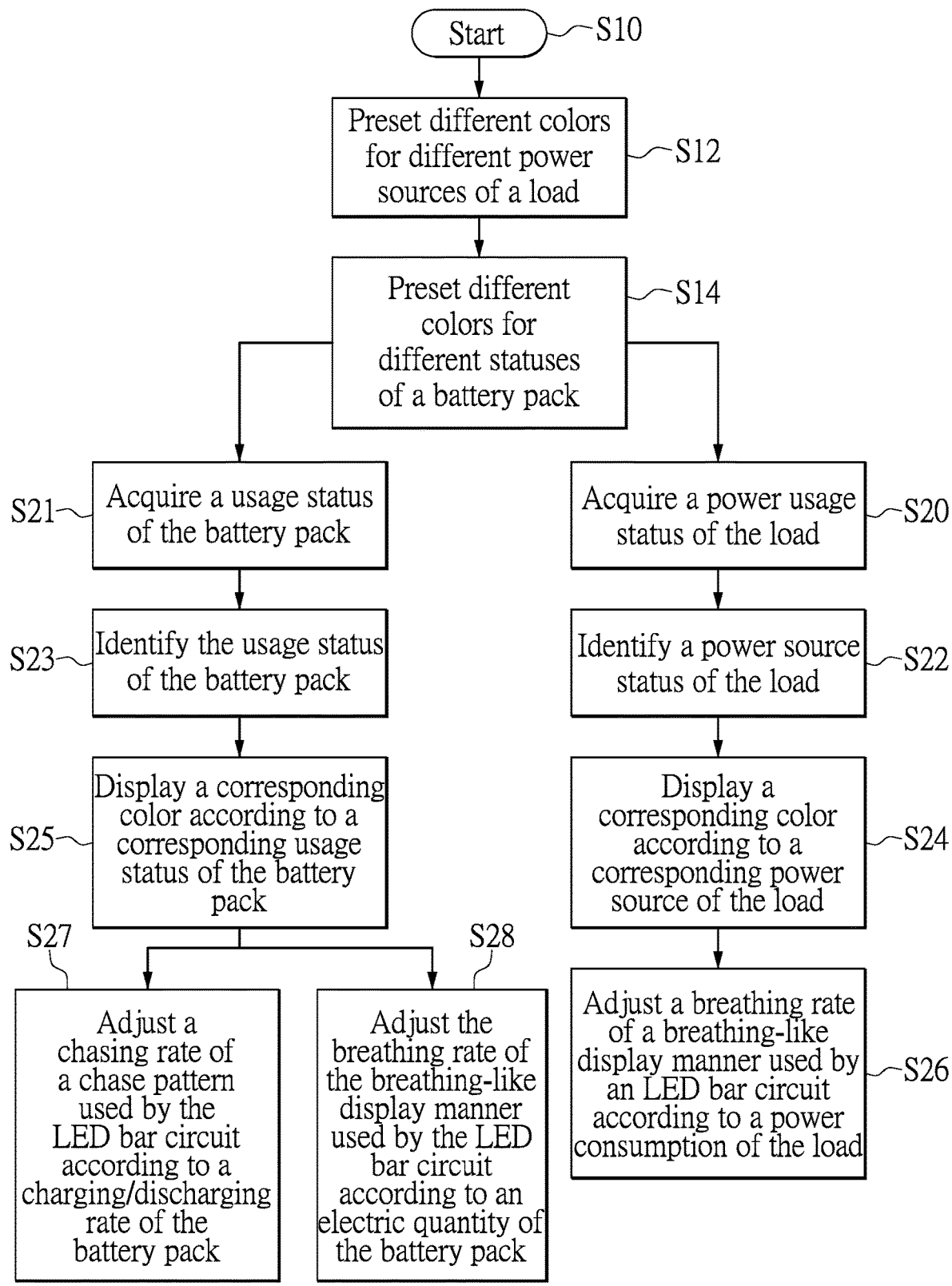
FIG. 2 is a flowchart of a method in an embodiment of the present disclosure.

Referring to FIG. 2, FIG. 2 is a flowchart of a method for displaying various statuses of a power device, and the method is applied to the hardware power device capable of displaying various statuses shown in FIGS. 1A, 1B, and 5 to 7. The method for displaying various statuses of a power device in the present disclosure includes the following steps. In step S10, a process starts. In step S12, different colors are preset for different power sources of a load. In step S14, different colors are preset for different statuses of a battery pack. Afterwards, the process is divided into two branches for description, to further detect and identify both a usage status of a power source of the load 60 and a usage status of the battery pack 15 and to further display corresponding LED light in a breathing-like manner or in a chase pattern. After step S14, steps S20 and S21 are separately performed. In step S20, a power usage status of the load is acquired; and in step S21, a usage status of the battery pack is acquired. Afterwards, steps S22 and S23 are separately performed. In step S22, a power source status of the load is identified; and in step S23, the usage status of the battery pack is identified. Then, steps S24 and S25 are separately performed. In step S24, a corresponding color is displayed according to a corresponding power source of the load; and in step S25, a corresponding color is displayed according to a corresponding usage status of the battery pack. Subsequently, step S26 is performed after step S24. In step S26, a breathing rate of the breathing-like display manner used by an LED bar circuit is adjusted according to a power consumption of the load. After step S25, step S27 or step S28 is performed according to a different usage status of the battery pack. In step S27, a chasing rate of the chase pattern used by the LED bar circuit is adjusted according to a charging/discharging rate of the battery pack; or in step S28, the breathing rate of the breathing-like display manner used by the LED bar circuit is adjusted according to an electric quantity of the battery pack. Thus, the method for displaying various statuses of a power device in the present disclosure is completed.

Figure 3:
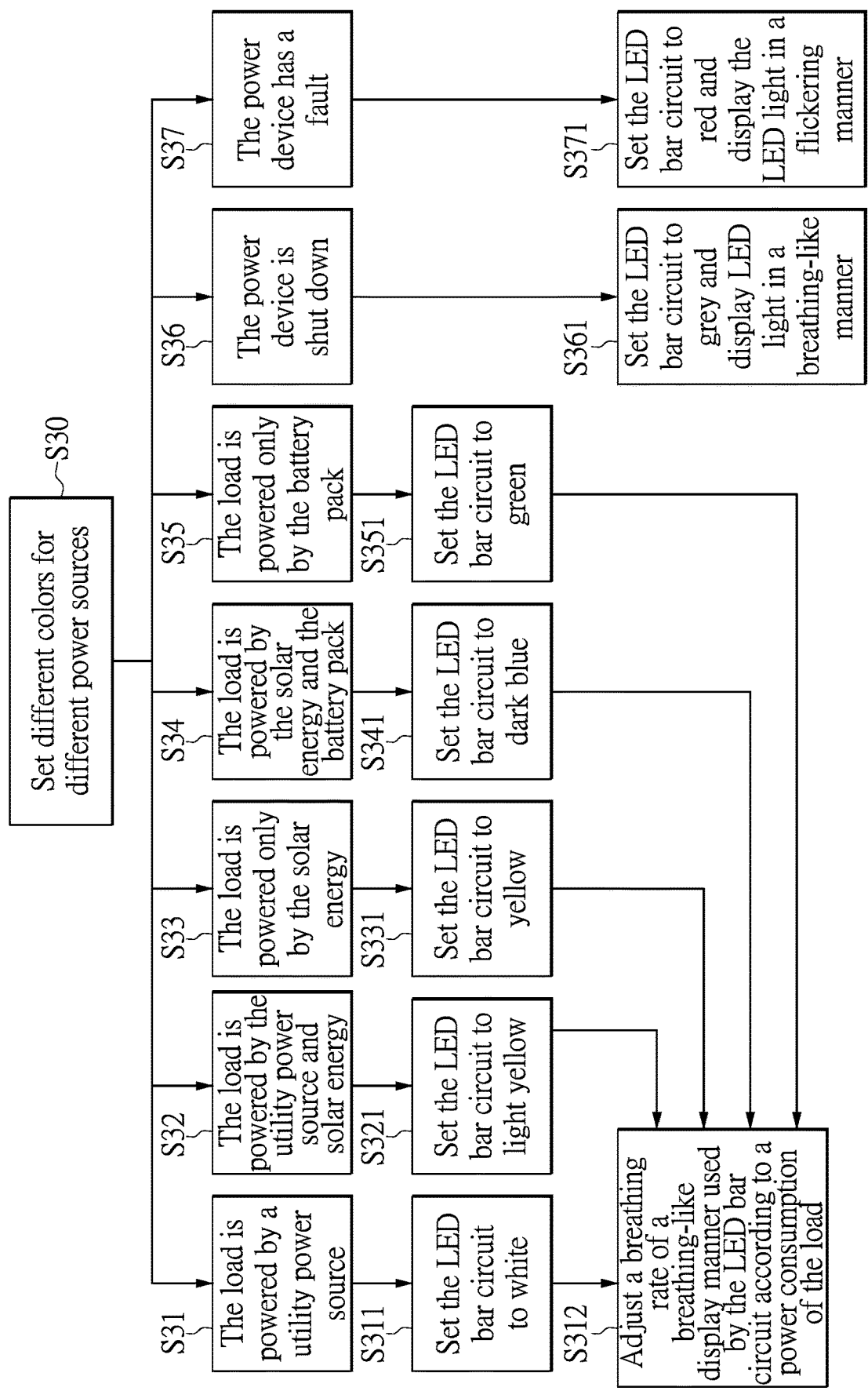
FIG. 3 is a flowchart of setting different colors for different power sources in an embodiment of the present disclosure.

Reference is made to a process shown in FIG. 3, which further describes in detail the process shown in FIG. 2. The present disclosure further provides the following process of setting corresponding colors for the different power sources of the load 60. Firstly, in step S30, different colors are set for different power sources of the load. Then, the process goes to steps S31 to S37 of separately setting a corresponding color for a corresponding power source of the load. In step S31, the load is powered by a utility power source, and then in step S311, the LED bar circuit is set to a first color, where the first color is white in an embodiment in an actual application, as described in FIG. 3. Then step S312 is performed: adjusting a breathing rate of the breathing-like display manner used by the LED bar circuit according to a power consumption of the load. In step S32, the load is powered by the utility power source and solar energy, and then in step S321, the LED bar circuit is set to a second color, where the second color is light yellow in an embodiment in an actual application, as described in FIG. 3. Then step S312 is performed: adjusting a breathing rate of the breathing-like display manner used by the LED bar circuit according to a power consumption of the load. In step S33, the load is powered only by the solar energy, and then in step S331, the LED bar circuit is set to a third color, where the third color is yellow in an embodiment in an actual application, as described in FIG. 3. Then step S312 is performed:

adjusting a breathing rate of the breathing-like display manner used by the LED bar circuit according to a power consumption of the load. In step S34, the load is powered by solar energy and the battery pack, and then in step S341, the LED bar circuit is set to a fourth color, where the fourth color is dark blue in an embodiment in an actual application, as described in FIG. 3. Then step S312 is performed: adjusting a breathing rate of the breathing-like display manner used by the LED bar circuit according to a power consumption of the load. In step S35, the load is powered only by the battery pack, and then in step S351, the LED bar circuit is set to a fifth color, where the fifth color is green in an embodiment in an actual application, as described in FIG. 3. Then step S312 is performed: adjusting a breathing rate of the breathing-like display manner used by the LED bar circuit according to a power consumption of the load. Content of the steps S36 and S37 is as follows: In step S36, the power device is shut down, and then step S361 is performed: setting the LED bar circuit to a sixth color and displaying LED light in a breathing-like manner, where the sixth color is grey in an embodiment in an actual application. In step S37, the power device has a fault, and then step S371 is performed: setting the LED bar circuit to a seventh color and displaying the LED light in a flickering manner, where the seventh color is red in an embodiment in an actual application.

Figure 4:
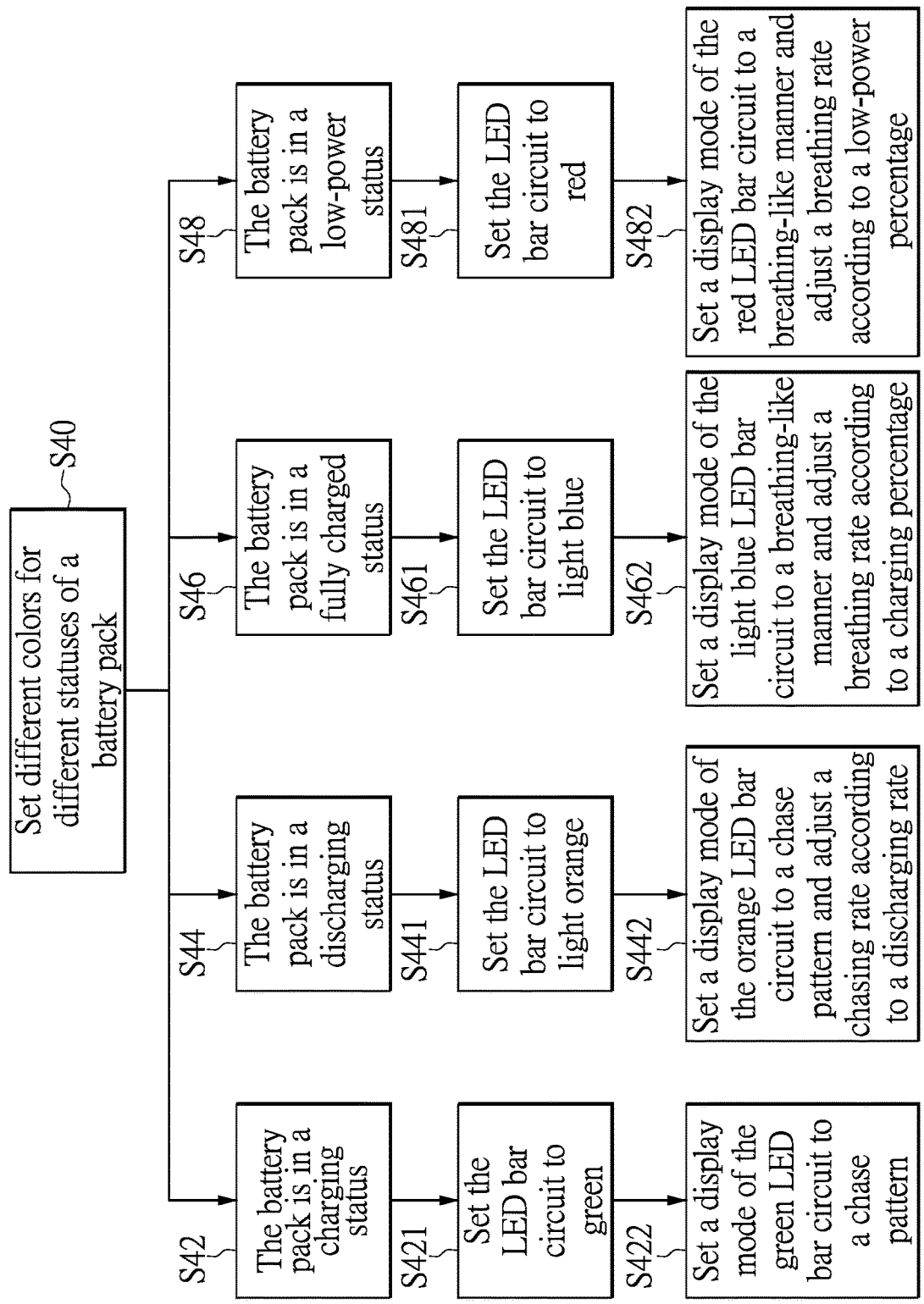
FIG. 4 is a flowchart of setting different colors for different statuses of a battery pack in an embodiment of the present disclosure.

Reference is made to FIG. 4, which further describes in detail the process shown in FIG. 2. The present disclosure further provides the following process of setting to display corresponding colors for the different usage statuses of the battery pack 15. First in step S40, different colors are set for different statuses of the battery pack, and then, the process goes to steps S42 to S48 for separately setting the colors. In step S42, the battery pack is in a charging status, then in step S421, the LED bar circuit is set to the fifth color, and afterwards step S422 is performed: setting a display mode of the LED bar circuit to a chase pattern. The fifth color is green in an embodiment in an actual application, as described in FIG. 4. In step S44, the battery pack is in a discharging status, then in step S441, the LED bar circuit is set to an eighth color, and afterwards step S442 is performed: setting a display mode of the LED bar circuit to a chase pattern and adjusting a chasing rate according to a discharging rate. The eighth color is orange in an embodiment in an actual application. In step S46, the battery pack is in a fully charged status, then in step S461, the LED bar circuit is set to a ninth color, and afterwards step S462 is performed: setting a display mode of the LED bar circuit to a breathing-like manner and adjusting a breathing rate according to a charging percentage. The ninth color is light blue in an embodiment in an actual application. In step S48, the battery pack is in a low-power status, then in step S481, the LED bar circuit is set to the seventh color, and afterwards step S482 is performed: setting a display mode of the LED bar circuit to a breathing-like manner and adjusting a breathing rate according to a low-power percentage. The seventh color is red in an embodiment in an actual application.

As shown in FIG. 5, the LED bar circuit 11 of the present disclosure is provided on the exterior of the power device 10, and specifically, on the front surface of the power device 10. During actual manufacturing, the LED bar circuit 11 is designed into a flat and elongated display unit, internally provided with a plurality of linearly arranged LED light-emitting elements. FIG. 5 also shows that the first display unit 11a and the second display unit 11b are provided on the upper side of the LED bar circuit 11 on the front surface of the power device 10, where the first display unit 11a and the second display unit 11b conduct alternate displaying. In an actual application, the power device 10 shown in FIG. 5 is an off-grid/energy-storage solar inverter.

FIG. 6 is a block diagram showing circuit connection in another embodiment of a power device 100 in the present disclosure, where the power device 100 is a UPS power device 100 in an actual application. The power device 100 capable of displaying various statuses includes: a central microprocessor 200, a power conversion circuit 140, an LED bar circuit 110, and a battery pack 150. Likewise, the power device 100 is externally connected to a utility power source 30, a backup battery pack 50, and a load 60. A difference between this embodiment and the power device 10 in FIG. 1A lies in that, the power device 100 in FIG. 6 is a UPS device and thus is not coupled to a solar power source. The central microprocessor 200 is also internally provided with a color setting and control logic circuit 260, the power conversion circuit 140 is electrically coupled to the central microprocessor 200, the LED bar circuit 110 is electrically coupled to the central microprocessor 200, and the battery pack 150 is electrically coupled to the power conversion circuit 140 and is also one of backup power sources of the power device. The power device 100 is electrically coupled to the utility power source 30 that is used as a main power source of the power device 100 under normal conditions. In the case of a power outage of the utility power source 30, the battery pack 150 supplies required power to the power device 100. An output of the power device 100 is electrically coupled to the load 60.

Moreover, the power device 100 shown in FIG. 6 further includes an LCD display circuit 120 and a communication module circuit 13. The LCD display circuit 120 is coupled to the central microprocessor 200, and mainly uses an LCD screen to display text and digital information related to an operation of the power device 100. The communication module circuit 13 is also coupled to the central microprocessor 200, and is used to establish a communicative connection between the power device 100 and an external device or other communication devices, such as a smart phone or tablet PC of the user, or an electric device monitoring server.

The color setting and control logic circuit 260 shown in FIG. 6 also enables the LED bar circuit 11 to correspondingly emit LED light of at least two colors according to different power sources supplied to the load. Specifically, the embodiment of FIG. 6 is the same as the embodiment of FIG. 1A, but excluding the solar photovoltaic power source. That is, the utility power source 30, and the battery pack 150 or the backup battery pack 50 are only used as the different power sources to form different combinations to enable a display of different LED light, so as to implement emission of LED light of at least two colors in the foregoing embodiment. Moreover, the LED light is also displayed in a breathing-like manner. The central microprocessor 200 also adjusts the breathing rate of the LED light according to a power consumption of the load 60. Furthermore, the color setting and control logic circuit 260 correspondingly emits LED light of at least two colors according to different usage statuses of the battery pack 15. When the battery pack 150 performs charging or discharging, the LED light emitted by the LED bar circuit 11 is displayed in a chase pattern; and when the battery pack 150 is fully charged or in a low-power status, the LED light is displayed in a breathing-like manner. The color setting and control logic, the breathing rate, and the chasing rate are all identical with the related content disclosed in FIG. 1A.

In FIG. 6, the central microprocessor 200 is internally provided with a load power source control and detection logic circuit 220, a battery status detection logic circuit 240, and a computational logic circuit 280 for displaying a load or energy storage status. The load power source control and detection logic circuit 220 is indirectly electrically coupled to the utility power source 30 and the load 60, and is electrically coupled to the power conversion circuit 140 and the color setting and control logic circuit 260. The load power source control and detection logic circuit 220 is mainly used to enable the central microprocessor 200 to identify which one of the external utility power source 30 and the internal battery pack 150 is used by the power device 100 during an operation of the load 60 externally connected to the power device 100. The battery status detection logic circuit 240 is electrically coupled to the power conversion circuit 140 and the color setting and control logic circuit 260, and is used to enable the central microprocessor 200 to identify an operating status of the battery pack 150 in the power device 100. The computational logic circuit 280 for displaying a load or energy storage status is indirectly electrically coupled to the load 60, and is electrically coupled to the power conversion circuit 140 and the color setting and control logic circuit 260. The computational logic circuit 280 for displaying a load or energy storage status is used to enable the central microprocessor 200 to identify an actual power consumption of the load 60 in operation and further to identify different execution statuses of the battery pack 150. The color setting, control, and display manner and the corresponding process are identical with those described in embodiments of FIGS. 1A and 2 to 4, and a difference there-between lies in that the embodiment of FIG. 6 does not use the solar photovoltaic power source as an external power source. Therefore, in the embodiment of FIG. 6, by deleting the content related to the color setting and control logic of the solar photovoltaic power source, the embodiment regarding the color setting and control logic and the related process of the UPS device shown in FIG. 6 can be implemented.

As shown in FIG. 7, FIG. 7 is a structural diagram of a UPS device corresponding to the power device 100 in the embodiment shown in FIG. 6. During actual manufacturing, the LED bar circuit 11 is designed into a flat and elongated display unit, internally provided with a plurality of linearly arranged LED light-emitting elements. FIG. 7 also shows that the first display unit 11a and the second display unit 11b are provided on the upper side of the LED bar circuit 11 on the front surface of the power device 100, where the first display unit 11a and the second display unit 11b conduct alternate displaying.

To sum up, the present disclosure uses an LED bar circuit 11, and enables LED light emitted from the LED bar circuit to change in color according to different power sources of a load 60 connected to a power device 10. Further, the LED light is displayed in a breathing-like manner at different breathing rates to indicate whether a low current or a heavy current passes through the load 60 in operation; or the LED light is displayed in a chase pattern at different chasing rates to indicate a battery discharging rate. Therefore, the present disclosure can enable a user, observer, or monitor, beyond a certain distance from the power device, to conveniently and immediately tell the current power usage status of the load 60 connected to the power device 10. Thus, the user, observer, or monitor can know the power usage status of a machine from a distance without the need to walk to the power device 10 to read text/digital information related to the power usage, which can meet actual application requirements of the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power device capable of displaying various statuses, comprising:
   a central microprocessor internally provided with a color setting and control logic circuit;
   a power conversion circuit electrically coupled to the central microprocessor;
   a light emitting diode (LED) bar circuit electrically coupled to the central microprocessor; and
   a battery pack electrically coupled to the power conversion circuit and being one of power sources of the power device, wherein
   the power device is electrically coupled to a utility power source and a solar photovoltaic power source which serve as different power sources of the power device; and an output of the power device is electrically coupled to a load; and
   the color setting and control logic circuit enables the LED bar circuit to correspondingly emit LED light of at least two colors according to different power sources supplied to the load, and the LED light is displayed in a breathing-like manner; and the central microprocessor adjusts a breathing rate of the LED light according to a power consumption of the load.

2. The power device of claim 1, wherein the color setting and control logic circuit correspondingly emits LED light of at least two colors according to different usage statuses of the battery pack; when the battery pack performs charging or discharging, the LED light is displayed in a chase pattern; and when the battery pack is fully charged or in a low-power status, the LED light is displayed in a breathing-like manner.

3. The power device of claim 2, wherein the central microprocessor adjusts a chasing rate of the LED light according to a charging/discharging rate of the battery pack, and adjusts a breathing rate of the LED light according to a charging percentage or a low-power percentage of the battery pack.

4. The power device of claim 1, wherein the central microprocessor is internally provided with:
   a load power source control and detection logic circuit, being indirectly electrically coupled to the utility power source, and being indirectly electrically coupled to the solar photovoltaic power source and then indirectly electrically coupled to the load, wherein the load power source control and detection logic circuit is further electrically coupled to the power conversion circuit and the color setting and control logic circuit, and is used to enable the central microprocessor to identify a specific power source which is externally or internally supplied to the power device during the operation of the load;

a battery status detection logic circuit, electrically coupled to the power conversion circuit and the color setting and control logic circuit, and used to enable the central microprocessor to identify different operating statuses of the battery pack; and a computational logic circuit for displaying a load or energy storage status, indirectly electrically coupled to the load and electrically coupled to the power conversion circuit and the color setting and control logic circuit, wherein the computational logic circuit for displaying a load or energy storage status is used to enable the central microprocessor to identify an actual power consumption of the load in operation and to identify different execution statuses of the battery pack.

5. The power device of claim 1, further including:

a first display unit, provided on a side of the LED bar circuit, electrically coupled to the central microprocessor, and used to indicate that the LED bar circuit currently displays an operating status of the load; and a second display unit, provided on a side of the LED bar circuit, electrically coupled to the central microprocessor, and used to indicate that the LED bar circuit currently displays an operating and execution status of the battery pack, wherein the first display unit and the second display unit are alternately turned on or turned off, that is, only one of the first display unit and the second display unit is turned on at once.

6. A method for displaying various statuses of a power device, wherein the method is applied to the power device capable of displaying various statuses in claim 1, and the method comprises:

presetting different colors for different power sources of a load;

presetting different colors for different statuses of a battery pack;

acquiring a power usage status of the load, and acquiring a usage status of the battery pack;

identifying a power source status of the load, and identifying the usage status of the battery pack;

displaying a corresponding color according to a corresponding power source of the load, and displaying a corresponding color according to a corresponding usage status of the battery pack; and adjusting a breathing rate of a breathing-like display manner used by an LED bar circuit according to a power consumption of the load; and adjusting a chasing rate of a chase pattern used by the LED bar circuit according to a charging/discharging rate of the battery pack or adjusting the breathing rate of the breathing-like display manner used by the LED bar circuit according to an electric quantity of the battery pack.

7. The method of claim 6, wherein the step of setting different colors for different power sources of a load further includes:

if the load is powered by a utility power source, setting the LED bar circuit to a first color and then adjusting a breathing rate of the breathing-like display manner used by the LED bar circuit according to a power consumption of the load;

if the load is powered by the utility power source and solar energy, setting the LED bar circuit to a second color and then adjusting a breathing rate of the breathing-like display manner used by the LED bar circuit according to a power consumption of the load;

if the load is powered only by the solar energy, setting the LED bar circuit to a third color and then adjusting a breathing rate of the breathing-like display manner used by the LED bar circuit according to a power consumption of the load;

if the load is powered by the solar energy and the battery pack, setting the LED bar circuit to a fourth color and then adjusting a breathing rate of the breathing-like display manner used by the LED bar circuit according to a power consumption of the load;

if the load is powered only by the battery pack, setting the LED bar circuit to a fifth color and then adjusting a breathing rate of the breathing-like display manner used by the LED bar circuit according to a power consumption of the load;

if the power device is shut down, setting the LED bar circuit to a sixth color and displaying LED light in a breathing-like manner; and if the power device has a fault, setting the LED bar circuit to a seventh color and displaying the LED light in a flickering manner.

8. The method of claim 6, wherein the step of setting different colors for different statuses of a battery pack further includes:

if the battery pack is in a charging status, setting the LED bar circuit to the fifth color and setting a display mode of the LED bar circuit to a chase pattern;

if the battery pack is in a discharging status, setting the LED bar circuit to an eighth color, and setting a display mode of the LED bar circuit to a chase pattern and adjusting a chasing rate according to a discharging rate;

if the battery pack is in a fully charged status, setting the LED bar circuit to a ninth color, and setting a display mode of the LED bar circuit to a breathing-like manner and adjusting a breathing rate according to a charging percentage; and if the battery pack is in a low-power status, setting the LED bar circuit to the seventh color, and setting a display mode of the LED bar circuit to a breathing-like manner and adjusting a breathing rate according to a low-power percentage.

9. A power device capable of displaying various statuses, comprising:

a central microprocessor, internally provided with a color setting and control logic circuit;

a power conversion circuit, electrically coupled to the central microprocessor;

an LED bar circuit, electrically coupled to the central microprocessor; and a battery pack, electrically coupled to the power conversion circuit and being one of power sources of the power device;

wherein the power device is electrically coupled to a utility power source which serves as one of the power sources of the power device; and an output of the power device is electrically coupled to a load;

wherein the color setting and control logic circuit enables the LED bar circuit to correspondingly emit LED light of at least two colors according to different power sources supplied to the load, and the LED light is displayed in a breathing-like manner; and the central microprocessor adjusts a breathing rate of the LED light according to a power consumption of the load; and wherein the color setting and control logic circuit correspondingly emits LED light of at least two colors according to different usage statuses of the battery pack; when the battery pack performs charging or discharging, the LED light is displayed in a chase pattern; and when the battery pack is fully charged or in a low-power status, the LED light is displayed in a breathing-like manner.

10. The power device of claim 9, wherein the central microprocessor is internally provided with:
   a load power source control and detection logic circuit, indirectly electrically coupled to the utility power source and the load, wherein the load power source control and detection logic circuit are further electrically coupled to the power conversion circuit and the color setting and control logic circuit, and are used to enable the central microprocessor to identify a specific power source which is externally or internally supplied to the power device during an operation of the load;
   a battery status detection logic circuit, electrically coupled to the power conversion circuit and the color setting and control logic circuit, and used to enable the central microprocessor to identify different operating statuses of the battery pack; and
   a computational logic circuit for displaying a load or energy storage status, indirectly electrically coupled to the load and electrically coupled to the power conversion circuit and the color setting and control logic circuit, wherein the computational logic circuit for displaying a load or energy storage status is used to enable the central microprocessor to identify an actual power consumption of the load in operation and to identify different execution statuses of the battery pack.

\* \* \* \* \*